(12) United States Patent
Gwon

(10) Patent No.: US 6,991,264 B2
(45) Date of Patent: Jan. 31, 2006

(54) COMPRESSOR AND METHOD OF CONNECTING PIPE TO THE SAME

(75) Inventor: Young Soo Gwon, Kwangju (KR)

(73) Assignee: Samsung Gwangju Electronics Co., Ltd., Kwangju (KR)

( * ) Notice: Subject to any disclaimer, the term of this patent is extended or adjusted under 35 U.S.C. 154(b) by 133 days.

(21) Appl. No.: 10/452,710

(22) Filed: Jun. 2, 2003

(65) Prior Publication Data

US 2004/0188999 A1 Sep. 30, 2004

(51) Int. Cl.
*F16L 41/00* (2006.01)

(52) U.S. Cl. .................. 285/215; 285/339; 285/213
(58) Field of Classification Search ............... 285/215, 285/339, 213; 403/314, 367–369
See application file for complete search history.

(56) References Cited

U.S. PATENT DOCUMENTS

| 116,098 | A | * | 6/1871 | Reynolds | 285/215 |
|---|---|---|---|---|---|
| 184,314 | A | * | 11/1876 | Ancona | 285/215 |
| 527,883 | A | * | 10/1894 | Pratt | 285/215 |
| 698,471 | A | * | 4/1902 | Drake | 285/215 |
| 731,513 | A | * | 6/1903 | Shaffer | 285/215 |
| 1,304,414 | A | * | 5/1919 | Triplett | 285/215 |
| 2,147,239 | A | * | 2/1939 | Buchanan | 439/863 |
| 2,420,721 | A | * | 5/1947 | Pennella | 285/215 |
| 3,722,923 | A | * | 3/1973 | Grahl | 285/55 |
| 3,830,532 | A | * | 8/1974 | Roberts | 285/341 |
| 3,879,070 | A | * | 4/1975 | Russ | 285/342 |
| 4,765,659 | A | * | 8/1988 | Goubeaux et al. | 285/215 |
| 4,799,715 | A | * | 1/1989 | Goubeaux et al. | 285/215 |
| 5,238,072 | A | * | 8/1993 | Hesse | 173/90 |
| 5,447,420 | A | * | 9/1995 | Caillat et al. | 418/55.5 |
| 5,674,062 | A | * | 10/1997 | Weatherston | 418/55.1 |
| 5,956,959 | A | * | 9/1999 | Sunaga et al. | 62/114 |
| 6,698,714 | B2 | * | 3/2004 | Dulac | 251/148 |

* cited by examiner

*Primary Examiner*—Vishal Patel
(74) *Attorney, Agent, or Firm*—Ladas & Parry LLP

(57) ABSTRACT

A compressor which has a pipe coupling structure capable of fluid-tightly connecting a refrigerant pipe to a pipe coupling port, without needing any welding process to connect the pipe to the pipe coupling port, and a method of connecting the refrigerant pipe to the pipe coupling port of the compressor. The compressor includes a pipe to form a refrigerant path through which a refrigerant flows, a pipe coupling port connected to the pipe, and a hollow bushing having an inner surface to define a hole to receive an end of the pipe, and an outer surface to come into contact with the pipe coupling port, when the hollow bushing is thrust at an end thereof, at which the end of the refrigerant pipe is placed, so as to be compression-fitted into the pipe coupling port. The method includes inserting the hollow bushing into the pipe coupling port, inserting the end of the pipe into the hole of the hollow bushing, and thrusting the hollow bushing at the end of the bushing, at which the end of the refrigerant pipe is placed, so as to compression-fit the bushing into the pipe coupling port. The present invention simplifies a pipe connecting process, reduces the number of pipe coupling elements to improve productivity during the pipe connecting process, and accomplishes a firm pipe coupling structure and a desired sealing effect at a junction of the pipe and the port.

6 Claims, 4 Drawing Sheets

COMPRESSOR AND METHOD OF CONNECTING PIPE TO THE SAME

CROSS-REFERENCE TO RELATED APPLICATION

This application claims the benefit of Korean Application No. 2003-20031, filed Mar. 31, 2003, in the Korean Intellectual Property Office, the disclosure of which is incorporated herein by reference.

BACKGROUND OF THE INVENTION

1. Field of the Invention

The present invention relates, in general, to a compressor, and a method of connecting a pipe to the compressor and, more particularly, to a compressor, and a method of connecting a refrigerant pipe to a pipe coupling port of the compressor.

2. Description of the Related Art

As disclosed in Korean Patent Application Nos. 10-2000-0075129 and 10-1999-0064248, compressors for refrigeration systems, such as refrigerators and air conditioners, include a drive motor unit, a compression unit, an exhaust muffler, an exhaust pipe, a suction muffler, and a suction pipe. The drive motor unit generates a rotating force, while the compression unit has a compression chamber to compress refrigerant by use of the rotating force of the drive motor unit. The exhaust muffler reduces operational noise of the compressor which may be caused by exhaust pulses generated when the compressed refrigerant under high pressure is discharged from the compression chamber. The exhaust pipe is connected to an exhaust port provided at the exhaust muffler so as to form an exhaust path for the compressed refrigerant discharged from the compressor. The suction muffler reduces the operational noise of the compressor, caused by suction pulses generated when the refrigerant is sucked into the compression chamber. The suction pipe is connected to a suction port provided at the suction muffler, thus forming a suction path for the refrigerant sucked into the compressor. In the compressor, the suction pipe and the exhaust pipe form refrigerant paths to guide the refrigerant into and from the compressor. There have been proposed some compressors having one or more additional refrigerant pipes, in addition to the above-mentioned suction pipe and exhaust pipe, as disclosed in Korean Patent Application No. 10-2001-0011835 which was filed by the inventor of the present invention.

In the conventional compressors, the refrigerant pipes, including the suction pipe, exhaust pipe and the additional refrigerant pipes, must be fluid-tightly mounted to pipe coupling ports of the compressor through a welding process so as to accomplish a sealing effect at junctions of the pipes and the pipe coupling ports, as disclosed in Korean Utility Model Application No. 20-1998-0026610. However, due to the welding process, a process of connecting the refrigerant pipes to the pipe coupling ports of the compressor is undesirably complicated, and a pipe connection cost is increased. Furthermore, the welded junctions of the pipes and the pipe coupling ports may be reduced in strength thereof, due to severe welding conditions, such as thermal stress generated in the welded junctions during the welding process. Therefore, the welded junctions of the pipes and the pipe coupling ports may be broken to lose desired sealing effect thereof.

SUMMARY OF THE INVENTION

Accordingly, it is an aspect of the present invention to provide a compressor which has a pipe coupling structure capable of fluid-tightly connecting a refrigerant pipe to a pipe coupling port, without needing any welding process to connect the pipe to the pipe coupling port.

It is another aspect of the present invention to provide a method of connecting a refrigerant pipe to a pipe coupling port of the compressor having the above-mentioned pipe coupling structure.

Additional aspects and advantages of the invention will be set forth in part in the description which follows and, in part, will be obvious from the description, or may be learned by practice of the invention.

The foregoing and other aspects of the present invention are achieved by providing a compressor, including a pipe coupling structure formed by a hollow bushing which has an inner surface to define a hole to receive an end of a refrigerant pipe, and an outer surface to come into contact with a pipe coupling port of the compressor, when the hollow bushing is thrust at an end thereof, at which the end of the refrigerant pipe is placed, so as to be compression-fitted into the pipe coupling port to connect the refrigerant pipe to the pipe coupling port.

In the compressor, the outer surface of the hollow bushing is tapered such that the end of the hollow bushing, at which the end of the refrigerant pipe is placed, has a larger outer diameter.

In the compressor, the hollow bushing is compression-fitted into the pipe coupling port in the same direction as a refrigerant flowing direction.

The foregoing and other aspects of the present invention are also achieved by providing a compressor, including: a pipe to form a refrigerant path through which a refrigerant flows; a pipe coupling port connected to the pipe; and a hollow bushing having an inner surface to define a hole to receive an end of the pipe, and an outer surface to come into contact with the pipe coupling port, when the hollow bushing is thrust at an end thereof, at which the end of the refrigerant pipe is placed, so as to be compression-fitted into the pipe coupling port.

In the compressor, the outer surface of the hollow bushing is tapered such that the end of the hollow bushing, at which the end of the refrigerant pipe is placed, has a larger outer diameter.

The pipe may be an exhaust pipe through which the refrigerant is discharged from the compressor after being compressed.

The pipe may be a suction pipe through which the refrigerant is sucked into the compressor.

In the compressor, the hollow bushing is compression-fitted into the pipe coupling port in the same direction as a refrigerant flowing direction.

The hollow bushing is made of brass.

The foregoing and other aspects of the present invention are also achieved by providing a method of connecting a pipe to a pipe coupling port of a compressor, including: inserting a hollow bushing into the pipe coupling port; inserting an end of the pipe into a hole defined by an inner surface of the hollow bushing; and thrusting the hollow bushing at an end of the bushing, at which the end of the refrigerant pipe is placed, so as to compression-fit the bushing into the pipe coupling port and connect the refrigerant pipe to the pipe coupling port.

In the method, the end of the pipe is inserted into the hole of the hollow bushing in a direction opposite to a direction in which the hollow bushing is inserted into the pipe coupling port.

The foregoing and other aspects of the present invention are also achieved by providing a method of connecting a pipe to a pipe coupling port of a compressor, including: passing an end of the pipe through the pipe coupling port, and inserting the end of the pipe into a hole of a hollow bushing, which is defined by an inner surface of the hollow bushing; inserting the hollow bushing, receiving the end of the pipe therein, into the pipe coupling port; and thrusting the hollow bushing at an end of the bushing, at which the end of the refrigerant pipe is placed, so as to compression-fit the bushing into the pipe coupling port and connect the refrigerant pipe to the pipe coupling port.

In the method, the hollow bushing is thrust in the same direction as a refrigerant flowing direction.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
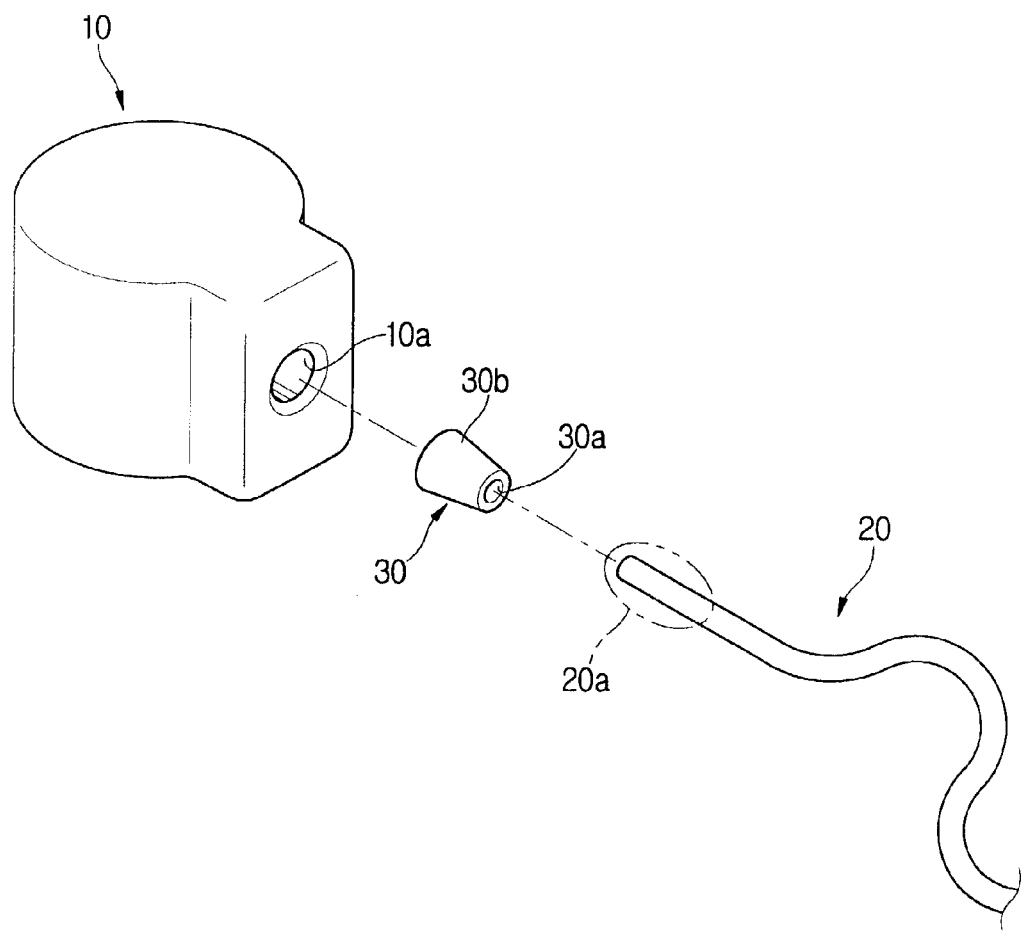
FIG. 1 is an exploded perspective view of pipe coupling elements of a compressor, according to an embodiment of the present invention.

Reference will now be made in detail to the present preferred embodiments of the present invention, examples of which are illustrated in the accompanying drawings, wherein like reference numerals refer to like elements throughout.

In the following description of an embodiment with reference to the accompanying drawings, the present invention is applied to an exhaust muffler which is provided in a compressor to reduce operational noise of the compressor caused by exhaust pulses generated when a compressed refrigerant under high pressure is discharged from a compression chamber, and to a pipe connection for fluid-tightly connecting an exhaust pipe (an example of a refrigerant pipe of the compressor) to an exhaust port (an example of a pipe coupling port of the compressor) provided at the exhaust muffler.

Figure 2:
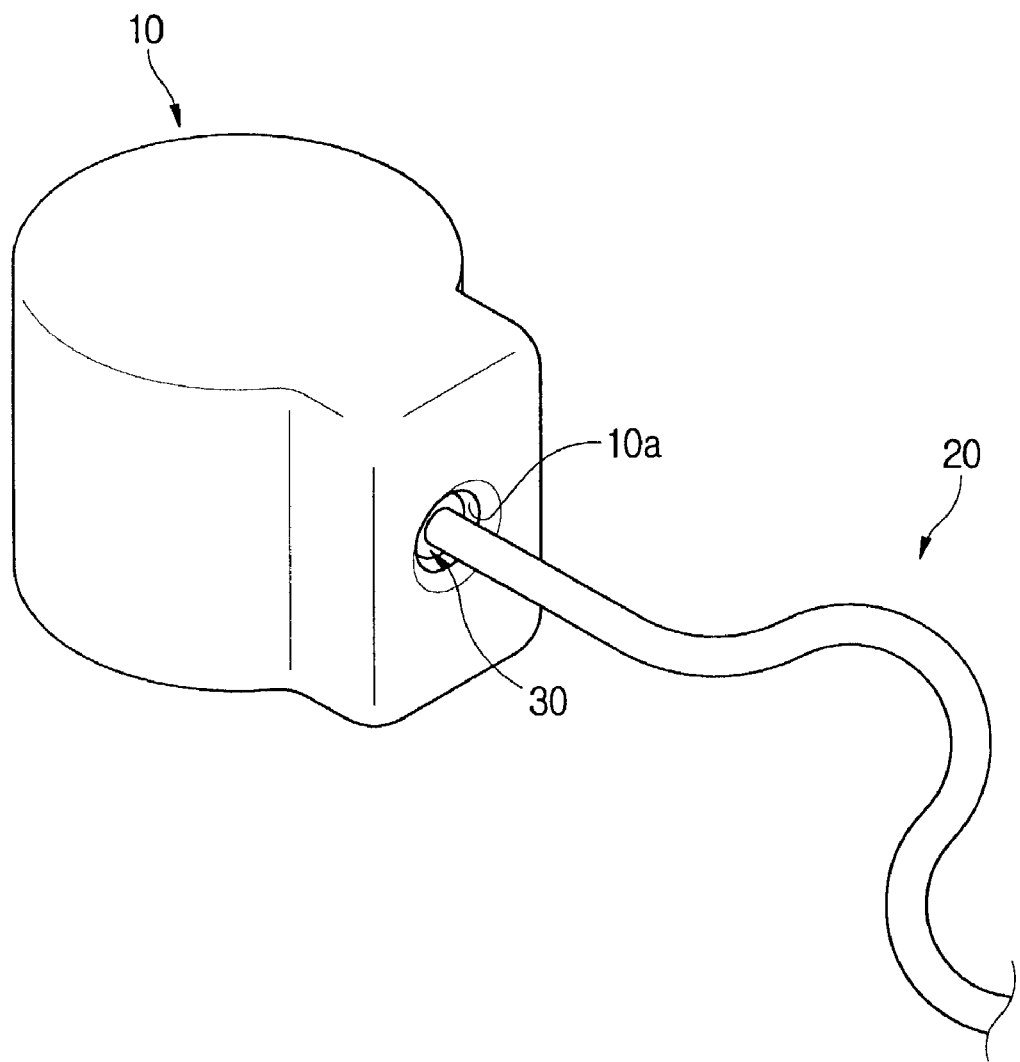
FIG. 2 is a perspective view of the pipe coupling elements of FIG. 1, when the pipe coupling elements are assembled with each other and thereby a refrigerant pipe is connected to a pipe coupling port.
Figure 3:
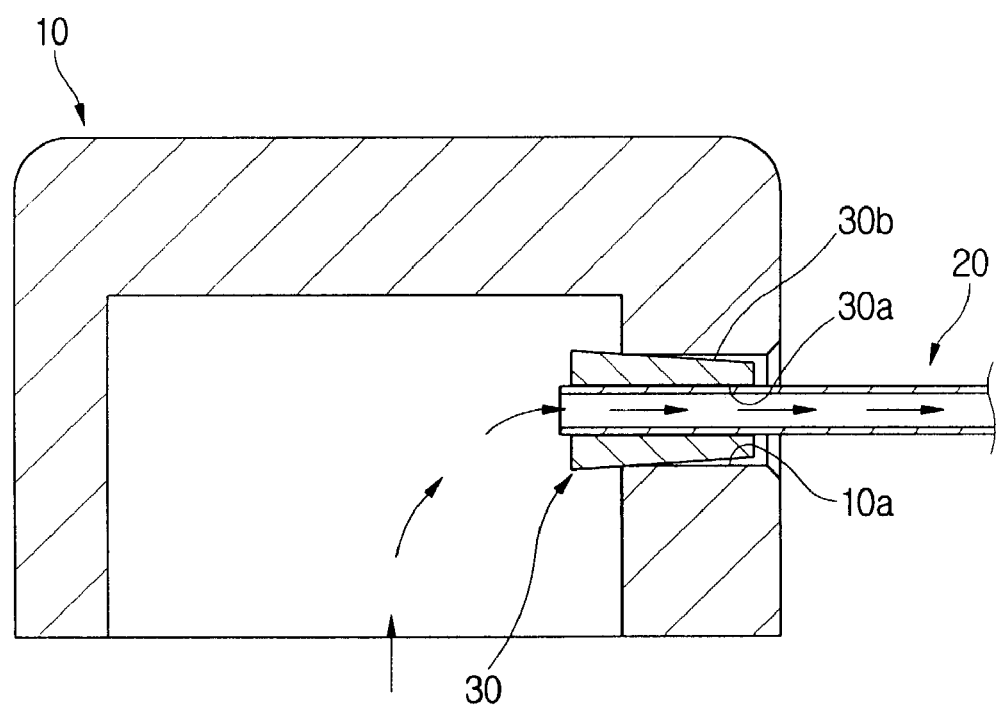
FIG. 3 is a sectional view of the assembled pipe coupling elements of FIG. 2.

FIG. 1 is an exploded perspective view of pipe coupling elements of a compressor, according to an embodiment of the present invention. FIG. 2 is a perspective view of the pipe coupling elements of FIG. 1, when the pipe coupling elements are assembled with each other and thereby a refrigerant pipe (exhaust pipe) is connected to a pipe coupling port (exhaust port). FIG. 3 is a sectional view of the assembled pipe coupling elements of FIG. 2.

As shown in FIGS. 1 to 3, the compressor according to the embodiment of the present invention includes an exhaust muffler 10, an exhaust pipe 20, and a hollow bushing 30. The exhaust muffler 10 is provided in the compressor to reduce operational noise of the compressor caused by exhaust pulses generated when a compressed refrigerant under high pressure is discharged from a compression chamber. The exhaust pipe 20 is fluid-tightly connected to an exhaust port 10a of the exhaust muffler 10. The hollow bushing 30 is an element which fluid-tightly connects the exhaust pipe 20 to the exhaust port 10a of the exhaust muffler 10, thus accomplishing a pipe coupling structure according to the present invention.

The hollow bushing 30 is a tubular body having a trapezoidal cross-section, in the longitudinal direction, with an inner surface to define an axial hole 30a to receive an end 20a of the exhaust pipe 20, and an outer surface 30b to come into contact with an inner surface of the exhaust port 10a, when the hollow bushing 30 is compression-fitted into the exhaust port 10a, as shown in FIGS. 1 and 3. In such a case, the end 20a of the exhaust pipe 20 is placed in a space inside the exhaust muffler 10. The outer surface 30b of the hollow bushing 30 is tapered such that a first end of the hollow bushing 30, at which the end 20a of the exhaust pipe 20 is placed, has a larger outer diameter, and a second end of the hollow bushing 30 has a smaller outer diameter, as shown in FIG. 3. That is, the outer diameter of the first end of the hollow bushing 30, at which the end 20a of the exhaust pipe 20 is placed, is larger than a diameter of the exhaust port 10a, while the outer diameter of the second end of the hollow bushing 30 is smaller than the diameter of the exhaust port 10a. Therefore, in order to compression-fit the hollow bushing 30 into the exhaust port 10a, the hollow bushing 30 is thrust at the first end thereof in the space of the exhaust muffler 10 outward. In the pipe coupling structure of the exhaust muffler 10, the compressed refrigerant under high pressure flows in a direction as shown by the arrows of FIG. 3, so that it is preferred to compression-fit the hollow bushing 30 into the exhaust port 10a in the same direction as the refrigerant flowing direction, in consideration of a structural strength of the pipe coupling structure under high pressure of the compressed refrigerant.

A method of connecting a refrigerant pipe to a pipe coupling port of the compressor by use of the hollow bushing 30 according to the present invention will be described herein below, with reference to FIGS. 4A to 4F.

Figure 4A:
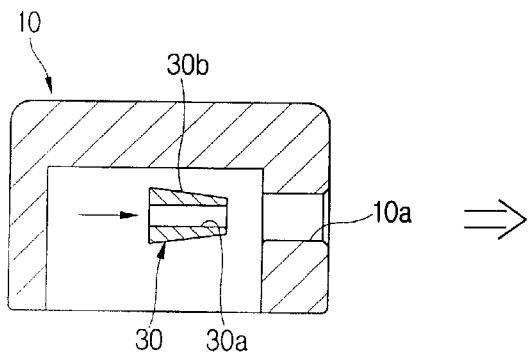
FIGS. 4A to 4F are sectional views showing a process of assembling the pipe coupling elements of FIG. 1 with each other to connect the refrigerant pipe to the pipe coupling port.
Figure 4B:
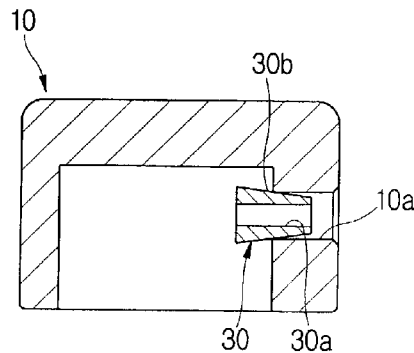

In order to connect the exhaust pipe 20 to the exhaust port 10a of the exhaust muffler 10 by use of the hollow bushing 30, the hollow bushing 30 is preliminarily inserted, in first operation, into the exhaust port 10a in a direction from the inside to the outside of the exhaust muffler 10, as shown in FIGS. 4A and 4B. In such a case, the insertion of the hollow bushing 30 into the exhaust port 10a is performed in the space of the exhaust muffler 10.

Figure 4C:
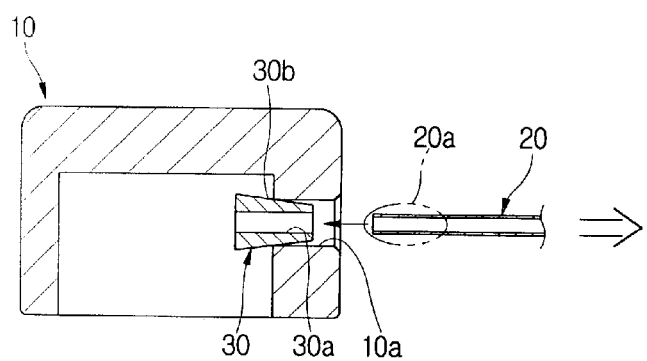
Figure 4D:
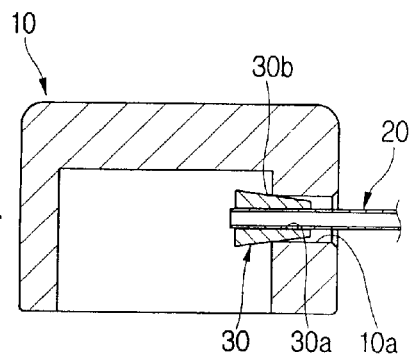

Thereafter, the end 20a of the exhaust pipe 20 is inserted, in second operation, into the hole 30a of the preliminarily inserted hollow bushing 30 in a direction from the outside to the inside of the exhaust muffler 10, as shown in FIGS. 4C and 4D. In such a case, it is noted that the inserted direction of the end 20a of the exhaust pipe 20 into the axial hole 30a of the hollow bushing 30 is opposite to the inserted direction of the hollow bushing 30 into the exhaust port 10a of the exhaust muffler 10.

In the present invention, the first and second operations may be altered as follows. That is, the end 20a of the exhaust pipe 20 may pass through the exhaust port 10a of the exhaust muffler 10 in the direction from the outside to the inside of the exhaust muffler 10 so as to be inserted into the hole 30*a* of the hollow bushing 30 which is placed in the space of the exhaust muffler 10 without being inserted into the exhaust port 10*a*. After the end 20*a* of the exhaust pipe 20 is inserted into the hole 30*a* of the hollow bushing 30 as described above, the hollow bushing 30 is fitted into the exhaust port 10*a* in the direction from the inside to the outside of the exhaust muffler 10.

Figure 4E:
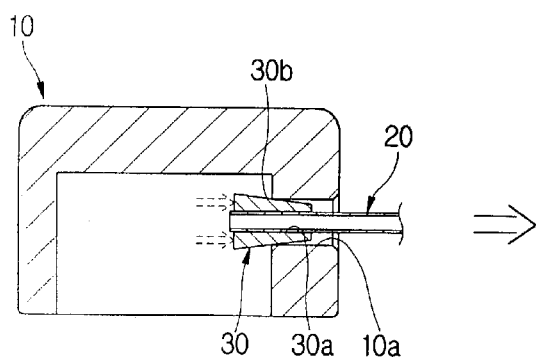
Figure 4F:
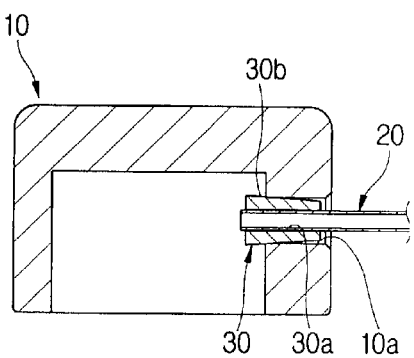

After the second operation, the hollow bushing 30*a* is thrust at the first end thereof, in third operation, by use of an appropriate tool, such as a jig, in the direction from the inside to the outside of the exhaust muffler 10 as shown by the dotted arrows of FIG. 4E, so that the hollow bushing 30 is compression-fitted into the exhaust port 10*a*, as shown in FIG. 4F. Therefore, the inner surface of the exhaust port 10*a* compresses the outer surface 30*b* of the hollow bushing 30, thus accomplishing a desired sealing effect at a junction between the inner surface of the exhaust port 10*a* and the outer surface 30*b* of the hollow bushing 30. In addition, the inner surface of the hollow bushing 30 compresses an outer surface of the exhaust pipe 20, thus accomplishing a desired sealing effect at a junction between the inner surface of the hollow bushing 30 and the outer surface of the exhaust pipe 20, and firmly grasping the end 20*a* of the exhaust pipe 20. That is, the hollow bushing 30 is compressed at the two junctions of the inner surface of the exhaust port 10*a* and the outer surface 30*b* of the bushing 30, and of the inner surface of the hollow bushing 30 and the outer surface of the exhaust pipe 20. The hollow bushing 30 thus firmly connects the exhaust pipe 20 to the exhaust port 10*a* while fluid-tightly sealing the junction of the exhaust pipe 20 and the exhaust port 10*a*.

Since the hollow bushing 30 must seal the junction of the exhaust pipe 20 and the exhaust port 10*a*, without being broken regardless of a thrust force applied thereto from the jig, it is preferable to produce the hollow bushing 30 using a metal of good ductility and malleability. Copper is more preferably used as the material of the hollow bushing 30 since the copper reduces the production cost of the bushing 30, and brass is most preferably used as the material of the bushing 30 since the brass allows the bushing 30 to have desired ductility and malleability and maintain a desired structural strength of the pipe coupling structure.

In the present invention, the hollow bushing 30, receiving the end 20*a* of the exhaust pipe 20 in the hole 30*a*, is compression-fitted into the exhaust port 10*a* by being thrust at the first end thereof, at which the end 20*a* of the exhaust pipe 20 is placed, in the direction from the inside to the outside of the exhaust muffler 10, which is the same as a refrigerant flowing direction in the pipe coupling structure. The above-mentioned compression-fitted direction of the hollow bushing 30 into the exhaust port 10*a* is determined, due to the following reasons.

First, the compression-fitted direction of the hollow bushing 30 into the exhaust port 10*a* is determined to maintain a desired structural strength of the pipe coupling structure, in consideration of a flowing direction of the high-pressure refrigerant. As well known to those skilled in the art, the high-pressure refrigerant flows through a path while applying high pressure to surroundings. Therefore, when the hollow bushing 30 is compression-fitted into the exhaust port 10*a* in a direction opposite to the refrigerant flowing direction, the hollow bushing 30 may be damaged to be reduced in its structural strength and lose its desired sealing effect due to the high pressure of the refrigerant applied thereto.

Second, the compression-fitted direction of the hollow bushing 30 into the exhaust port 10*a* is determined to accomplish desired work efficiency while thrusting the hollow bushing 30 by use of an appropriate tool, such as the jig. That is, when the hollow bushing 30 is thrust by use of the jig at the first end of the bushing 30, at which the end 20*a* of the exhaust pipe 20 is placed, as disclosed in the embodiment of the present invention, it is easy to compression-fit the bushing 30 into the exhaust port 10*a* without causing any interference between the jig and the pipe 20. However, when the hollow bushing 30 is thrust at the second end of the bushing 30, at which the long exhaust pipe 20 extends to the outside of the exhaust muffler 10, the exhaust pipe 20 may interfere with the jig, and, furthermore, the pipe 20 may be damaged or broken by the jig.

As apparent from the above description, the present invention provides a compressor which has a pipe coupling structure capable of fluid-tightly connecting a refrigerant pipe to a pipe coupling port of the compressor, without needing any welding process to connect the pipe to the pipe coupling port, different from a conventional compressor. The present invention also provides a method of connecting a refrigerant pipe to a pipe coupling port of the compressor having the above-mentioned pipe coupling structure. The present invention does not need any welding process to connect the refrigerant pipe to the pipe coupling port of the compressor, so that the process of connecting the refrigerant pipes to the pipe coupling ports of the compressor is simplified. In addition, the pipe connection cost is reduced, and a desired sealing effect at junctions of the refrigerant pipes and the pipe coupling ports is accomplished.

Although a preferred embodiment of the present invention has been shown and described, it would be appreciated by those skilled in the art that changes may be made in these embodiments without departing from the principles and spirit of the invention, the scope of which is defined in the claims and their equivalents.

For example, in the preferred embodiment of the accompanying drawings, the present invention is applied to the pipe connection in which the exhaust pipe is connected to the exhaust port provided at the exhaust muffler of the compressor. However, it should be understood that the application of the present invention is not limited to the exhaust muffler, but may be applied to a variety of pipe connections to connect all the refrigerant pipes of the compressor, including the exhaust pipe, suction pipe and other refrigerant pipes, to all the pipe coupling ports of the compressor, including the exhaust port, suction port and other pipe coupling ports, without affecting the functioning of the present invention.

What is claimed is:

1. The compressor, comprising:

an exhaust muffler through which high pressure refrigerant flows, a pipe coupling structure formed by a hollow bushing which has an inner surface to define a hole to receive an end of a refrigerant pipe from which the refrigerant is discharged, said bushing having an outer surface to come into contact with a pipe coupling port provided in a wall of the exhaust muffler, when the hollow bushing is thrust at an end thereof, at which an end of the refrigerant pipe is placed, so as to be compression-fitted into the pipe coupling port to connect the refrigerant pipe to the pipe coupling port said pipe coupling port being cylindrical and having a constant diameter from an outer surface of the muffler to an inner surface of the muffler, said outer surface of the bushing being uniformly tapered and having a diameter at said end, at which the thrust is applied, which is greater than the diameter of said hole and a diameter at an opposite end which is less than the diameter of said hole, said refrigerant pipe being compression-fitted in said bushing when said bushing is compression-fitted in said port, said hollow bushing being thrust in a direction to produce the compression-fitting thereof in the port which is the same direction as the flow of the high pressure refrigerant through the muffler to the refrigerant pipe.

2. The compressor according to claim 1, wherein the hollow bushing is made of brass.

3. The compressor according to claim 1 wherein the hollow brushing is made of a ductile and malleable material.

4. A method of connecting a refrigerant pipe to a pipe coupling port in a wall of a muffler of a compressor, said method comprising the steps of, providing a hollow bushing in the interior of a muffler of a compressor, forming the hollow bushing with an outer surface which is uniformly tapered from a larger diameter first end of the bushing to a smaller diameter second end of the bushing, providing a port of uniform diameter through a wall of the muffler of the compressor, the diameter of the bushing at said first end being greater than the diameter of said port whereas the diameter of the bushing at said second end is less than the diameter of the port, inserting a refrigerant pipe through the port in the wall of the muffler and into the smaller end of the bushing in the interior of the muffler until the end of the pipe is substantially located at the larger diameter end of the bushing, inserting the smaller diameter end of the bushing, together with the pipe therein, through the port in the wall of the muffler in a direction opposite the direction of insertion of the pipe through the port in the wall of the muffler, and applying a thrust force, from within the muffler, against the larger diameter end of the bushing in a direction to force the bushing more deeply into the port to cause the bushing to be deformed and compression-fit in the port in the wall of the muffler while concurrently compression-fitting the pipe in the bushing, the direction of insertion of the bushing in the wall of the muffler being the same as the direction of flow of high pressure refrigerant in the pipe so that the flow of refrigerant under high pressure to intensify the compression-fit of the bushing in the hole in the muffler and the compression-fit of the bushing and the pipe.

5. The method according to claim 4 comprising forming the bushing or a material which is ductile and malleable.

6. The method of claim 5 wherein the material of the bushing is brass.

* * * * *

UNITED STATES PATENT AND TRADEMARK OFFICE
CERTIFICATE OF CORRECTION

PATENT NO.         : 6,991,264 B2                                       Page 1 of 1
APPLICATION NO. : 10/452710
DATED              : January 31, 2006
INVENTOR(S)        : Young Soo Gwon It is certified that error appears in the above-identified patent and that said Letters Patent is hereby corrected as shown below:

On title page, insert -- (30) Foreign Application Priority Data Mar. 31, 2003 (KR) .......... 2003-20031 --.

Signed and Sealed this

First Day of May, 2007

JON W. DUDAS
*Director of the United States Patent and Trademark Office*